United States Patent
Takane et al.

(10) Patent No.: US 9,711,815 B2
(45) Date of Patent: Jul. 18, 2017

(54) POLYMER ELECTROLYTE FUEL CELL

(75) Inventors: Tomoyuki Takane, Tokyo (JP); Naoko Matsuura, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 0 days.

(21) Appl. No.: 13/822,763

(22) PCT Filed: Oct. 5, 2011

(86) PCT No.: PCT/JP2011/073453
§ 371 (c)(1),
(2), (4) Date: May 20, 2013

(87) PCT Pub. No.: WO2012/046870
PCT Pub. Date: Apr. 12, 2012

(65) Prior Publication Data
US 2013/0330649 A1    Dec. 12, 2013

(30) Foreign Application Priority Data
Oct. 5, 2010  (JP) ................... 2010-225647

(51) Int. Cl.
*H01M 8/10*     (2016.01)
*H01M 8/1004*   (2016.01)
(Continued)

(52) U.S. Cl.
CPC .......... *H01M 8/1004* (2013.01); *H01M 8/02* (2013.01); *H01M 8/1051* (2013.01);
(Continued)

(58) Field of Classification Search
CPC .... H01M 8/02; H01M 8/1051; H01M 8/1004; H01M 2008/1095; H01M 8/1023; H01M 8/1039; Y02E 60/521
(Continued)

(56) References Cited

U.S. PATENT DOCUMENTS

2001/0026883 A1* 10/2001 Higuchi et al. ................ 429/33
2002/0086795 A1*  7/2002 LaBarge ............ B01D 53/9422
                                                    502/208
(Continued)

FOREIGN PATENT DOCUMENTS

CN    1719648 A     1/2006
JP    62-086668     4/1987
(Continued)

OTHER PUBLICATIONS
International Search Report PCT/JP2011/073453 dated Jan. 24, 2012.
(Continued)

*Primary Examiner* — Muhammad Siddiquee
(74) *Attorney, Agent, or Firm* — Kilpatrick Townsend & Stockton, LLP

(57) ABSTRACT

An object of the invention is to provide a fuel cell having improved long-term durability.
The patent provides a fuel cell comprising a peroxide decomposition catalyst immobilized on a support, wherein the fuel cell is constituted of a membrane electrode assembly comprising a polyelectrolyte membrane, electrode layers placed on both the sides of the electrolyte membrane, and gas diffusion layers placed on the side opposite to the electrolyte membrane of the electrode layers, a gas sealing material placed surrounding the membrane electrode assembly, and separators sandwiching the foregoing.

16 Claims, 2 Drawing Sheets

(51) Int. Cl.
*H01M 8/02* (2016.01)
*H01M 8/1051* (2016.01)
*H01M 8/1018* (2016.01)
*H01M 8/1023* (2016.01)
*H01M 8/1039* (2016.01)

(52) U.S. Cl.
CPC ........ *H01M 8/1023* (2013.01); *H01M 8/1039* (2013.01); *H01M 2008/1095* (2013.01)

(58) Field of Classification Search
USPC .......................................... 429/483, 532, 534
See application file for complete search history.

(56) References Cited

U.S. PATENT DOCUMENTS

| | | | |
|---|---|---|---|
| 2004/0043283 A1* | 3/2004 | Cipollini et al. | 429/40 |
| 2005/0136308 A1 | 6/2005 | Andrews et al. | |
| 2005/0227135 A1* | 10/2005 | Chalkova | C08J 5/2275 |
| | | | 429/494 |
| 2007/0059577 A1 | 3/2007 | Takeuchi et al. | |
| 2007/0212594 A1 | 9/2007 | Takasu et al. | |
| 2008/0102339 A1* | 5/2008 | Galiano | B01D 67/0079 |
| | | | 429/483 |
| 2009/0098441 A1 | 4/2009 | Suga | |
| 2009/0155662 A1 | 6/2009 | Durante et al. | |
| 2009/0246591 A1 | 10/2009 | Roelofs | |
| 2010/0075187 A1* | 3/2010 | Muta et al. | 429/30 |
| 2010/0272828 A1* | 10/2010 | Sugiura | A01N 59/16 |
| | | | 424/604 |
| 2011/0070521 A1 | 3/2011 | Ishikawa et al. | |
| 2011/0091790 A1* | 4/2011 | Barnwell | H01M 8/1051 |
| | | | 429/483 |
| 2011/0301021 A1* | 12/2011 | Liu et al. | 502/170 |
| 2013/0046116 A1* | 2/2013 | Osborne et al. | 568/679 |

FOREIGN PATENT DOCUMENTS

| | | |
|---|---|---|
| JP | 9-253487 | 9/1997 |
| JP | 2001-118591 | 5/2001 |
| JP | 2002-159859 | 6/2002 |
| JP | 2004-121371 | 4/2004 |
| JP | 2004-185990 | 7/2004 |
| JP | 2005-353408 | 12/2005 |
| JP | 2006-107914 | 4/2006 |
| JP | 2006-261004 | 9/2006 |
| JP | 2007-95433 | 4/2007 |
| JP | 2008-081750 | 4/2008 |
| JP | 2008-204894 | 9/2008 |
| WO | WO-2006/071225 A1 | 7/2006 |
| WO | WO-2010/092999 A1 | 8/2010 |

OTHER PUBLICATIONS

Zhao et al., "Immobilizing catalysts on porous materials", Journal "Materials Today", Elsevier, Amsterdam, Nl, vol. 9, No. 3, Mar. 2006, pp. 32-38.

* cited by examiner

Prior Art

POLYMER ELECTROLYTE FUEL CELL

TECHNICAL FIELD

The present invention relates to a fuel cell, in particular to a fuel cell containing a peroxide decomposition catalyst immobilized on a support.

BACKGROUND ART

Due to upgrading of portable electronic devices, such as a notebook computer, a cell phone, and a PDA, the power consumption of such devices has been increasing in the recent years. Currently the major power source of such portable electronic devices is a lithium-ion secondary battery; however its energy density cannot keep up with the recent power consumption increase, and therefore is an obstacle to further upgrading of portable electronic devices.

As a next-generation power source with high energy density replacing a lithium-ion secondary battery, a polymer electrolyte fuel cell has drawn attention. A polymer electrolyte fuel cell is constituted by stacking a number of single cells. FIG. 1 shows a typical structure of a single cell. In FIG. 1 a polyelectrolyte membrane (ion exchange membrane) 10 is sandwiched from both sides by an anode catalyst layer 20 and a cathode catalyst layer 21, further the catalyst layers 20, 21 are sandwiched from both sides by an anode gas diffusion layer 40 and a cathode gas diffusion layer 41 (the gas diffusion layer being also called as a "porous substrate", or as a "carbon fiber-made current collector"), and the outer surfaces of the gas diffusion layers 40, 41 are open to gas channels (a fuel gas channel 50, and an oxygen-containing gas channel 51) constituted by separators 60, 61. A fuel gas ($H_2$, etc.) introduced through a channel 50 passes the anode gas diffusion layer 40 to reach the anode catalyst layer 20, where the fuel gas emits an electron to produce a proton ($H^+$) according to the following anode reaction. The proton passes the polyelectrolyte membrane 10 to reach the cathode catalyst layer 21, where the proton receives an electron according to the following cathode reaction to produce $H_2O$. The following are an anode reaction and a cathode reaction in the case that a fuel gas is hydrogen:

anode reaction: $H_2 \rightarrow 2H^+ + 2e^-$ cathode reaction: $\frac{1}{2}O_2 + 2H^+ + 2e^- \rightarrow H_2O$ As a fuel there are a hydrogen containing substance, such as hydrogen and sodium borohydride, an alcohol, such as methanol and ethanol, and other organic substance fuels. Among others, methanol has high volumetric energy density, is liquid and easy to carry, and therefore is suitable for use in a small sized portable device. If methanol is used as a fuel, usually methanol and water are reacted at an anode, and an aqueous methanol solution is supplied to an anode.

In an actual fuel cell, in addition to the above main reaction, side reactions take place. Typically hydrogen peroxide ($H_2O_2$) is produced. Although the production mechanism is not fully understood, it may be as follows: the production of hydrogen peroxide can take place both at an anode and at a cathode, and, for example, at a cathode hydrogen peroxide is seemingly produced by an incomplete reducing reaction of oxygen according to the following formula:

side reaction at cathode: $O_2 + 2H^+ + 2e^- \rightarrow 2H_2O_2$

While, it is believed that at the anode oxygen contained as an impurity or added intentionally in a gas, or dissolved in an electrolyte at a cathode and diffused to the anode should participate in a reaction, which reaction formula is identical with the aforedescribed side reaction at the cathode or as represented by the following formula:

side reaction at anode: $2M-H + O^{2-} \rightarrow 2M + H_2O_2$

Wherein M represents a catalytic metal used in the anode, and M–H represents a state in which hydrogen is adsorbed on the catalytic metal. Usually as a catalytic metal a noble metal such as platinum (Pt) is utilized.

The hydrogen peroxide generated at the electrodes is liberated from the electrodes by diffusion or otherwise and migrates into an electrolyte. The hydrogen peroxide is a strongly oxidizing substance and oxidizes various organic substances constituting the electrolyte. No detailed mechanism thereof has been clarified, it is believed however that, in most cases, hydrogen peroxide is activated to a radical, and the generated hydrogen peroxide radical acts as a primary reactive substance of an oxidation reaction. Namely, a radical generated by a reaction as described below presumably withdraws a hydrogen from an organic substance of the electrolyte, or breaks any other bond. Although a cause for activation to a radical is not exactly clear, it has been considered that it is catalyzed by contact with a heavy metal ion. Further, it is also believed that a radical can be formed by heat, light, etc.

$H_2O_2 \rightarrow 2 \cdot OH$ or $H_2O_2 \rightarrow \cdot H + \cdot OOH$

Several countermeasures for preventing deterioration of a polyelectrolyte membrane by a peroxide generated in an electrode layer have been proposed.

Patent Literature 1 proposes, in order to prevent deterioration of a polyelectrolyte membrane by a peroxide generated in an electrode layer, a solid polyelectrolyte, wherein a transition metal oxide having a catalytic activity for decomposing catalytically a peroxide, especially manganese oxide, ruthenium oxide, cobalt oxide, nickel oxide, chromium oxide, iridium oxide or lead oxide, is distributed in a polyelectrolyte membrane.

Patent Literature 2 proposes, in order to enhance the resistance to a hydrogen peroxide or peroxide radicals of a polyelectrolyte membrane containing a sulfonic acid group in a polymer electrolyte fuel cell, an electrolyte membrane for a polymer electrolyte fuel cell, wherein fine particles of a poorly-soluble cerium compound are admixed in the polyelectrolyte membrane.

Patent Literature 3 proposes, in order to improve the durability against a hydrogen peroxide or peroxide radicals and to enhance the mechanical strength of an electrolyte membrane, an electrolyte membrane for a polymer electrolyte fuel cell, wherein the polyelectrolyte membrane containing a cerium ion or a manganese ion is reinforced by a porous membrane or the like.

CITATION LIST

Patent Literature

Patent Literature 1: Japanese Published Unexamined Application No. 2001-118591,

Patent Literature 2: Japanese Published Unexamined Application No. 2006-107914, and Patent Literature 3: Japanese Published Unexamined Application No. 2007-95433.

SUMMARY OF INVENTION

Technical Problem

Patent Literatures 1 to 3 propose to add to an electrolyte membrane a substance (e.g. cerium), which decomposes hydrogen peroxide, to decompose a peroxide generated in an electrode layer. The substance decomposing hydrogen peroxide contained in an electrolyte membrane is effective in decomposing a peroxide at an early stage, however its peroxide decomposition activity decreases while a fuel cell is operated; and further there is a disadvantage of decrease in electricity generation performance. This is presumably because a substance decomposing hydrogen peroxide dissociates as an ion and the dissociated ion forms a salt with an electrolyte membrane to decrease the peroxide decomposition activity and decrease the ion conductivity of an electrolyte. Further conceivable is that the dissociated ion is transported inside a fuel cell or discharged outside the same by injected water or produced water existing in an electrolyte membrane to lower the peroxide decomposition activity. Thus, the long-term durability in the proposals of Patent Literature 1 to 3 is questionable.

An object of the present invention is to provide a fuel cell having improved long-term durability by immobilizing a peroxide decomposition catalyst on a support.

Solution to Problem

The present invention has the following aspects.
(1) A fuel cell constituted of: a membrane electrode assembly comprising a polyelectrolyte membrane, electrode layers placed on both the sides of the electrolyte membrane, and gas diffusion layers placed on the side opposite to the electrolyte membrane of the electrode layers; a gas sealing material placed surrounding the membrane electrode assembly; and separators sandwiching the foregoing, wherein the fuel cell comprising a peroxide decomposition catalyst immobilized on a support.
(2) The fuel cell according to (1) above, wherein the support has a three-dimensional structure or an interlayer structure, in which the catalyst is immobilized.
(3) The fuel cell according to (1) or (2) above, wherein the support is a clathrate compound or a layered compound.
(4) The fuel cell according to any one of (1) to (3) above, wherein the support comprises at least one selected from the set consisting of a phosphoric acid group, a phosphoric acid group, and a carboxylic acid group.
(5) The fuel cell according to any one of (1) to (4) above, wherein the particle diameter of the support is from 0.001 μm to 20 μ (both inclusive).
(6) The fuel cell according to any one of (3) to (5) above, wherein the clathrate compound has pores having a three-dimensional network, and the catalyst is immobilized in the pores.
(7) The fuel cell according to any one of (3) to (6) above, wherein the clathrate compound is an inorganic compound having a three-dimensional network.
(8) The fuel cell according to any one of (3) to (7) above, wherein the clathrate compound is zirconium phosphate having a three-dimensional network.
(9) The fuel cell according to any one of (3) to (5) above, wherein the layered compound has an interlayer structure, in which the catalyst is immobilized.
(10) The fuel cell according to any one of (3) to (5), and (9) above, wherein the layered compound is a clay mineral or an inorganic compound, having an interlayer structure.
(11) The fuel cell according to any one of (3) to (5), (9) and (10) above, wherein the layered compound is zirconium phosphate having an interlayer structure.
(12) The fuel cell according to any one of (1) to (11) above, wherein the catalyst comprises at least one selected from the set consisting of cerium, manganese, tungsten, zirconium, titanium, vanadium, yttrium, lanthanum, neodymium, nickel, cobalt, silver, ruthenium, chromium, iridium, platinum, palladium, rhodium, molybdenum, and iron.
(13) The fuel cell according to any one of (1) to (12) above, wherein the catalyst is cerium.
(14) The fuel cell according to any one of (1) to (13) above, wherein the catalyst is placed in at least one of the electrolyte membrane, the electrode layer, the gas diffusion layer, the gas sealing material, or the separator, or between the same.
(15) The fuel cell according to any one of (1) to (14) above, wherein the electrolyte membrane comprises a fluoro polymer having a sulfonic acid group and is reinforced by a reinforcing layer.

DESCRIPTION OF EMBODIMENTS

Figure 1:
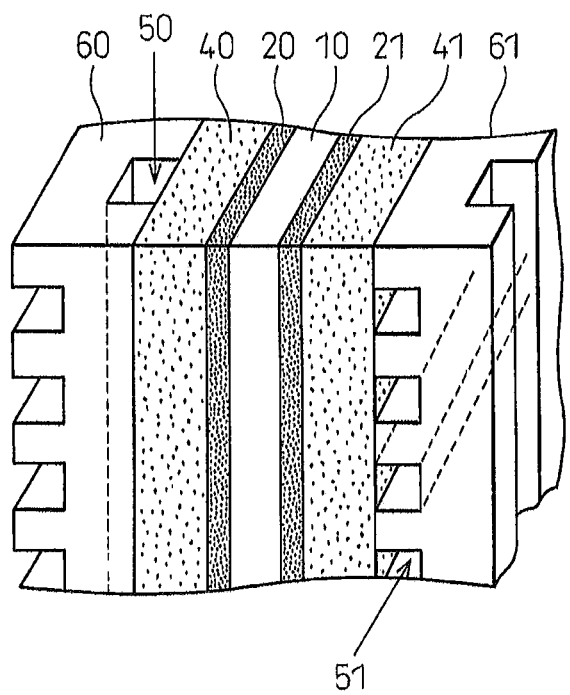
FIG. 1 is a schematic perspective view of a typical polymer electrolyte fuel cell (single cell).

A fuel cell according to the present invention is constituted by containing a peroxide decomposition catalyst immobilized on a support.

As a peroxide decomposition catalyst a heretofore known substance may be named, and there is no particular restriction, insofar as it can rapidly decompose a peroxide, especially hydrogen peroxide, generated during operation of a polymer electrolyte fuel cell. Examples of such a peroxide decomposition catalyst include a compound containing a transition element or a rare-earth element selected from the set consisting of cerium, manganese, tungsten, zirconium, titanium, vanadium, yttrium, lanthanum, neodymium, nickel, cobalt, silver, ruthenium, chromium, iridium, platinum, palladium, rhodium, molybdenum, and iron.

A peroxide decomposition catalyst should preferably be cerium or a compound containing cerium. The content of a peroxide decomposition catalyst with respect to the mass of a matrix material, to which the peroxide decomposition catalyst is added, is usually selected within a range of 0.01 to 80 mass-%, preferably 0.03 to 50 mass-%, and more preferably 0.05 to 10 mass-%. Since a peroxide decomposition catalyst has low ion conductivity, if the content exceeds 80 mass-%, the ion conductivity of a conjugate solid polyelectrolyte membrane is unfavorably disturbed. Further, a peroxide decomposition catalyst with low electron conductivity is undesirable, because the electron transport in a catalyst layer, a diffusion layer, or a separator is disturbed. Reversely, if the content of a peroxide decomposition catalyst is less than 0.01 mass-%, the catalytic activity for decomposing a peroxide decreases and an aimed object cannot be attained.

A support retains a peroxide catalyst in a dispersed form. It is favorable to micronize the dimension of a catalyst so that the catalyst surface area, that is the reaction area, can be enlarged. However, if a catalyst (metal) exists alone, it can easily coagulate to form large granules. Therefore, a catalyst is commonly supported on a support to prevent coagulation of the catalyst. A support itself may be formed into a porous body having a physical form desirable for a catalyst to be supported.

Immobilization of a peroxide decomposition catalyst on a support includes not only fixation to the support surface but also fixation into the support structure. In some cases a peroxide decomposition catalyst immobilized on a support surface may not be able to resist to transport of the peroxide decomposition catalyst by electroosmotic water or back diffusion water. As the result the peroxide decomposition catalyst may be detached from the support to form a salt with an electrolyte causing decrease in the ion conductivity, or movement in a stack or discharge outside the system. By immobilization of a peroxide decomposition catalyst in a support structure, the movement of the peroxide decomposition catalyst by electroosmotic water or back diffusion water is suppressed. This will suppress the decrease in the ion conductivity by forming a salt with an electrolyte, or the movement in a stack or the discharge outside the system of a peroxide decomposition catalyst.

By immobilizing a peroxide decomposition catalyst on a support, such difficulties as detachment of a peroxide decomposition catalyst from a support and formation of a salt with an electrolyte membrane causing decrease in the ion conductivity of an electrolyte or discharge out of the system can be avoided and the long-term durability can be improved, even if a fuel cell is under conditions from a low temperature to a high temperature, and from low humidification to high humidification.

A support may have a three-dimensional structure or an interlayer structure. It is possible to immobilize a peroxide decomposition catalyst into the three-dimensional structure or the interlayer structure. More specifically, a support may be a clathrate compound and/or a layered compound. Although examples of a clathrate compound and a layered compound include compounds containing Si, Zr, Ti, Fe, Al, Bi, Pd, Sn, Pb, Nb, and Ce, they are not limited to the described compounds. Further, there is no particular restriction on interchange of a part of the elements with another element or the composition rate. A clathrate compound and a layered compound will be described respectively in more detail.

A clathrate compound is a compound having a structure, in which, when a combination of at least 2 kinds of molecules crystallizes under an appropriate condition, one of the molecules forms a tunnel structure, a layered structure, or a three-dimensional network structure (referred to as "clathrate lattice") and the other molecule enters into a gap thereof. In other words, a clathrate compound can immobilize a peroxide decomposition catalyst by clathration. For example, a clathrate compound has pores forming a three-dimensional network, and a peroxide decomposition catalyst may be immobilized in the pores.

As a clathrate compound a heretofore known compound can be utilized. A clathrate compound may be either of an organic compound and an inorganic compound. In the case of an organic compound, a peroxide decomposition catalyst may be immobilized by forming a complex, namely utilizing an organic compound as a ligand. In the case of an inorganic compound, it has a three-dimensional network, and a proton, a metal ion, a water molecule, etc., constituting the three-dimensional structure may be exchanged with a peroxide decomposition catalyst for immobilizing the peroxide decomposition catalyst Examples of such an organic compound include a choleic acid prepared from deoxycholic acid and a fatty acid, iodine-starch, urea adduct, and cyclodextrin. Examples of such an inorganic compound include zirconium phosphate, and titanium phosphate; especially a NASICON-type (Na superionic conductor) zirconium phosphate, a NASICON-type titanium phosphate, and a silicate such as zeolite. Nevertheless a clathrate compound according to the present invention is not limited thereto.

Considering the environment in a fuel cell, a clathrate compound or a layered compound should preferably be superior in acid resistance, heat resistance, solvent resistance, etc. Considering chemical resistance, etc., generally an inorganic compound is more preferable. An example of a preferable clathrate compound is zirconium phosphate having a three-dimensional network. This is because zirconium phosphate is superior in water resistance, acid resistance, chemical resistance, heat resistance, etc.

A layered compound is a compound having a structure, in which planes with densely arrayed atoms bonded tightly to each other by covalent bonds, etc., are stacked parallel with a weak bonding force such as a van der Waals force. Between the planar molecule layers constituting a layered compound another atom or a molecule can be intercalated forming an intercalation compound. In other words, a layered compound has an interlayer structure, in which a peroxide decomposition catalyst can be immobilized. By immobilizing a peroxide decomposition catalyst between the layers, movement of the peroxide decomposition catalyst is suppressed and the long-term durability of a fuel cell can be improved. As a layered compound a heretofore known compound can be utilized. A layered compound may be either of a clayey mineral and an inorganic compound. Examples of a clayey mineral include kaolinite, halloysite, montmorillonite, illite, vermiculite, chlorite, and smectite. Examples of an inorganic compound include layered titanic acid (layered titanium phosphate), layered niobic acid, layered silicic acid, layered tungsten acid, layered tantalum acid, layered zirconium (layered zirconium phosphate), layered cerium (layered phosphate cerium), layered tin (layered tin phosphate), layered aluminium acid (layered aluminium phosphate), layered iron compound, and layered silicic acid.

An example of a preferable layered compound is layered zirconium phosphate. This is because a layered zirconium phosphate is superior in heat resistance, chemical resistance, and radiation resistance, and has high exchange ability.

A support may contain at least one of a phosphoric acid group, a phosphoric acid group, and a carboxylic acid group. The groups are less acidic than a sulfonic acid group. A sulfonic acid group is used as polyelectrolyte for an electrolyte membrane, etc., and can impart proton conductivity to an electrolyte membrane, etc. However, a sulfonic acid group may occasionally form a salt with a hydrogen peroxide decomposition catalyst ion to deteriorate the proton conductivity. In the coexistence of the group less acidic than a sulfonic acid group, a sulfonic acid group, and a hydrogen peroxide decomposition catalyst ion, a salt of the hydrogen peroxide decomposition catalyst ion and the less acidic group can be formed. Consequently, formation of a salt of the hydrogen peroxide decomposition catalyst ion and the sulfonic acid group is decreased. This will enable suppression of decrease in the proton conductivity by reason of formation of a salt with the sulfonic acid group.

A peroxide decomposition catalyst may be immobilized all over a support, or the peroxide decomposition catalyst may be immobilized on only a part of the support; and the support with the immobilized peroxide decomposition catalyst and the support without the immobilized catalyst may coexist as a mixture.

The particle diameter of a support is preferably 0.001 μm or more, and more preferably 0.01 μm or more. The particle diameter of a support is preferably 20 μm or less, and more preferably 10 μm or less. If the particle diameter is below the range, it may become difficult to immobilize a hydrogen peroxide decomposition catalyst on to a support (e.g. clathration, interlayer immobilization). However, if the particle diameter is beyond the range, the specific surface area of a support may be too small. Particularly according to the present invention a peroxide decomposition catalyst after immobilization in a support structure is placed or incorporated in a fuel cell constituent and/or between the constituents, and therefore there is some concern that the contact area between the peroxide decomposition catalyst and a peroxide may become smaller compared to the case where a peroxide decomposition catalyst is directly (without supporting) in a fuel cell constituent and/or between the constituents. Accordingly, it is desirable to reduce the particle diameter of a support carrying a peroxide decomposition catalyst to increase the surface area of the support and to enhance the peroxide decomposition activity of the supported catalyst.

There is no particular restriction on a method for immobilizing or intercalating a peroxide decomposition catalyst, and a heretofore known method can be utilized.

In the event that a peroxide decomposition catalyst is immobilized in a clathrate compound, for example, a NASICON-type zirconium phosphate and a metal nitrate ($M(NO_3)_n$) are mixed and then dried at 100 to 200° C., followed by a heat treatment at approx. 400 to 800° C. Through this, $H^+$ of the NASICON-type zirconium phosphate and $M^{n+}$ of a peroxide decomposition catalyst can be easily ion-exchanged to immobilize the peroxide decomposition catalyst. According to need, the crystallinity can be modified; the heat treatment may be omitted, or the heat treatment temperature may be raised to 1,000° C. or higher. As another specific production method, a sol-gel method may be applied.

While, a NASICON-type zirconium phosphate and a method for immobilization into a NASICON-type zirconium phosphate are described in detail in Japanese Published Unexamined Application No. 2004-286739.

In the event that a peroxide decomposition catalyst is immobilized in a layered compound, if the layered compound is ion exchangeable, immobilization can be performed by reacting the dispersed peroxide decomposition catalyst in a dispersion liquid. If the ion radius of a peroxide decomposition catalyst is large: an organic compound (an amine compound, alcohol, etc.) is first intercalated between layers to expand gaps between the layers, and then a peroxide decomposition catalyst is immobilized between the layers. Further, a layer may be exfoliated, a peroxide decomposition catalyst is immobilized on to the layer, and then the layers are combined, thereby completing the production. Further, production by adding a peroxide decomposition catalyst simultaneously, when a layered compound is produced, is also possible.

Further, a peroxide decomposition catalyst can be converted to an oxide by conducting sintering above 300° C. after a peroxide decomposition catalyst is intercalated.

A peroxide decomposition catalyst immobilized on a support can be placed or incorporated in a fuel cell constituent and/or between the constituents. The fuel cell constituent means an electrolyte membrane, an electrode layer, a gas diffusion layer, a gas sealing material, a separator, etc.

An electrolyte membrane according to the present invention will be described below. There is no particular restriction on the material of an electrolyte membrane according to the present invention, and a heretofore known electrolyte membrane can be utilized. An electrolyte membrane with only a hydrocarbon compound or only an inorganic polymer may be used. An electrolyte membrane preferably contains a fluoro polymer compound, from a viewpoint of the chemical durability of the electrolyte membrane itself. A fluoro polymer compound may contain besides a fluoro carbon structure ($—CF_2—$, $—CFCl-$) also a chlorocarbon structure ($—CCl_2-$) and other structures (e.g. $—O—$, $—S—$, $—C(=O)—$, $—N(R)—$, wherein R is an alkyl group). There is no particular restriction on the molecular structure of a polymer constituting an electrolyte membrane, and it may be based on either of a straight-chain and a branched-chain, or may contain a cyclic structure. Further, a fluoro polymer compound may be a partially fluorinated compound having both a C—H bond and a C—F bond in a polymer chain. It may be also a totally fluorinated compound without having a C—H bond in a polymer chain.

Preferable examples of a partially fluorinated compound include a polystyrene-graft-ethylene tetrafluoroethylene copolymer, and polystyrene-graft-poly tetrafluoroethylene, in which an electrolyte group such as a sulfonic acid group has been introduced in any of polymer chains, and a derivative thereof.

Preferable examples of a totally fluorinated compound include a perfluoro polymer having a sulfonic acid group in a side chain, such as Nafion® by E. I. du Pont de Nemours and Company, Aciplex® by Asahi Kasei Corporation, and Flemion® by Asahi Glass Co., Ltd., and a derivative thereof.

An electrolyte membrane is not limited to that containing only a fluoro polymer compound. Accordingly, an electrolyte membrane may be a mixture of a hydrocarbon polymer compound, which contains a C—H bond but not a C—F bond in the polymer chain, and a fluoro polymer compound. Further, an electrolyte membrane may be a mixture of an inorganic polymer and a fluoro polymer. Naturally, an electrolyte membrane may be an electrolyte with only a fluoro polymer compound.

Preferable examples of a hydrocarbon type compound include polyamide, polyacetal, polyethylene, polypropylene, an acrylic resin, polyester, polysulfone, and polyether, to which an electrolyte group such as a sulfonic acid group is introduced in any of polymer chains, and a derivative thereof (aliphatic hydrocarbon electrolyte); polystyrene, polyamide, polyamide-imide, polyimide, polyester, polysulfone, polyetherimide, polyethersulfone, and polycarbonate with an aromatic ring, to which an electrolyte group such as a sulfonic acid group is introduced in any of polymer chains, and a derivative thereof (partly aromatic hydrocarbon electrolyte membrane); and polyether ether ketone, polyether ketone, polysaruferen ether, polycarbonate, polyamide, polyamide-imide, polyester, and polyphenylene sulfide, to which an electrolyte group such as a sulfonic acid group is introduced in any of polymer chains, and a derivative thereof (wholly aromatic hydrocarbon electrolyte).

Examples of an inorganic polymer compound include a siloxane-type or silane-type organosilicon polymer, and especially an alkylsiloxane-type organosilicon polymer is preferable. Specific examples thereof include polydimethylsiloxane and γ-glycidoxypropyltrimethoxysilane.

In order to reinforce an electrolyte membrane, a sheet-formed porous reinforcing material may be used as a reinforcing layer. As a sheet-formed porous reinforcing material, any of commonly known materials may be utilized, insofar as it can reinforce an electrolyte membrane and does not impair the performance to be exerted with respect to a specific or individual application. For example, as a sheet-formed porous reinforcing material, a woven cloth, a non-woven cloth, a porous membrane, or a porous sheet described in Patent Literature 3 (Japanese Published Unexamined Application No. 2007-95433) may be used appropriately. If a solid polyelectrolyte conjugate membrane is reinforced and used for a polymer electrolyte fuel cell according to the present invention, an expanded porous PTFE is preferably used as a sheet-formed porous reinforcing material. The use of an expanded porous PTFE with the porosity of 35% or higher, preferably 50 to 97% is preferable. If the porosity is below 35%, the impregnation amount of a polyelectrolyte becomes too low, and, for example, electricity generation performance in an application of a polymer electrolyte fuel cell becomes inadequate. Reversely, if the porosity is beyond 97%, the reinforcing effect for a solid polyelectrolyte membrane becomes inadequate. The average pore size of an expanded porous PTFE is generally in a range of 0.01 to 50 µm, preferably 0.05 to 15 µm, and more preferably 0.1 to 3 µm. If the average pore size is below 0.01 µm, the impregnation of a polyelectrolyte to be reinforced into the reinforcing material may be occasionally difficult. Reversely, if the average pore size is beyond 50 µm, the reinforcing effect for a solid polyelectrolyte membrane becomes inadequate. While, the film thickness of an expanded porous PTFE is generally in a range of 1 to 30 µm, and preferably 2 to 20 µm. If the film thickness is below 1 µm, the reinforcing effect for a solid polyelectrolyte membrane may be occasionally inadequate. Reversely, if the film thickness is beyond 30 µm, a drawback in that the thickness of a fuel cell becomes too large, although the reinforcing effect for a solid polyelectrolyte membrane is already adequate, may be generated.

As a reinforcing material for an electrolyte membrane, a sheet-formed porous reinforcing material containing a peroxide decomposition catalyst on the surface or on the surface of pores may be used as described in the Patent Literature of Japanese Published Unexamined Application No. 2009-64777. A peroxide decomposition catalyst can be immobilized on a support according to the present invention. Further, according to the description in Patent Literature of WO 2008/026666, when a sheet-formed porous reinforcing material is produced, a peroxide decomposition catalyst immobilized in advance on a support according to the present invention may be mixed with raw materials to produce the sheet-formed porous reinforcing material.

A peroxide decomposition catalyst immobilized on a support can be incorporated in the electrolyte membrane. There is no particular restriction on a place and a method for incorporating a peroxide decomposition catalyst, and a heretofore known place and method can be utilized. The same can be uniformly dispersed and incorporated; meanwhile it can be also regulated to be incorporated in a desired place only. For example, if there are 2 or more layers of cation-exchange membranes (a layered membrane), not all of the layers but at least one layer is required to contain a peroxide decomposition catalyst. Since, for example, a hydrogen peroxide or a peroxy radical is apt to be generated on the cathode side and a polyelectrolyte existing on the cathode side deteriorates more easily, it is possible that a peroxide decomposition catalyst is incorporated only in an electrolyte layer on the cathode side. However, if the durability against a hydrogen peroxide or a peroxy radical is required to be enhanced especially on the anode side, it is also possible that a peroxide decomposition catalyst can be incorporated only in an electrolyte layer on the anode side.

Further, the concentration gradient of a decomposition catalyst from the anode side to the cathode side of an electrolyte membrane can be introduced, or the concentration of a decomposition catalyst can be decreased or increased from the center of an electrolyte membrane toward the edges.

There is no particular restriction on a method for introducing a concentration gradient, and a heretofore known method can be applied. For example, into a polyelectrolyte resin solution a peroxide decomposition catalyst is dispersed to prepare a dispersion, by step-by-step preparing dispersions with different concentrations of a peroxide decomposition catalyst, and forming layers therewith, a concentration gradient can be imparted to an electrolyte membrane.

Further, by preparing a plurality of electrolyte membranes with different concentrations of a decomposition catalyst and laminating the same, a concentration gradient can be imparted.

Further, a peroxide decomposition catalyst layer may be incorporated only in a specific place of an electrolyte membrane. For example, an electrolyte membrane may be formed with a layer containing a metal on carbon catalyst, a layer containing a peroxide decomposition catalyst, and a layer with only an electrolyte.

A metal on carbon catalyst can convert hydrogen crossed-over through a polyelectrolyte membrane from the anode side by oxidation to water, and self-supply of moisture required for humidifying the polyelectrolyte membrane is possible. It is also possible to block the cross-over of hydrogen, so as to prevent decrease in the cell voltage. Examples of a catalyst able to oxidize hydrogen include a metal on carbon catalyst, which carries at least one metal selected out of platinum, gold, palladium, rhodium, iridium, and ruthenium on a powder or a fiber of carbon. A layer containing a metal on carbon catalyst can be prepared by, adding the metal on carbon catalyst to the polyelectrolyte membrane. The additive amount of a metal on carbon catalyst with respect to a polyelectrolyte should be in a range of 0.01 to 80 mass-%.

More specifically, an electrolyte membrane may be formed by forming, from the cathode side to the anode side, firstly a layer with only an electrolyte, then a layer containing a metal on carbon catalyst, a layer containing a peroxide decomposition catalyst, and a layer with only an electrolyte, and laminating the same layer by a layer. Further, a layer containing a mixture of a metal on carbon catalyst and a peroxide decomposition catalyst may be provided. In this case, a layer containing a metal on carbon catalyst is preferably placed from around the center to the cathode side in the cross-section direction of an electrolyte membrane. This is because the metal on carbon catalyst can better promote a cathode electrode reaction ($\frac{1}{2}O_2 + 2H^+ + 2e^- \rightarrow H_2O$) depending on the partial pressures of hydrogen and oxygen crossed over, so as to suppress generation of a peroxide. Further, if a peroxide is generated as a by-product, a peroxide decomposition catalyst can decompose the peroxide to suppress migration of the peroxide to another layer.

An electrolyte containing a peroxide decomposition catalyst produced according to the aforedescribed production method may be used as an electrolyte for an electrode on the anode side and the cathode side. It may be used either on the anode side or the cathode side, or on both the sides. By this means, deterioration of an electrolyte for an electrode can be suppressed. This is because a part of a reduction reaction of oxygen at a cathode proceeds through a hydrogen peroxide, and a hydrogen peroxide or a peroxy radical generated in a cathode catalyst layer may cause deterioration of an electrolyte for an electrode, but a peroxide decomposition catalyst can suppress the deterioration by decomposing the hydrogen peroxide or the peroxy radical.

As above a peroxide decomposition catalyst immobilized on a support can be incorporated in an electrode layer, especially in a catalyst layer for an electrode.

An electrode layer (anode, cathode) according to the present invention will be described. An electrode layer is constituted of catalysts for an anode and a cathode respectively and an electroconductive material as a support. According to need, an electrode layer may contain an additive material, an electrolyte, etc. The electrode layer may further contain a peroxide decomposition catalyst immobilized on a support.

There is no particular restriction on an electrode catalyst, and a heretofore known catalyst can be used. Specific examples of an electrode catalyst include platinum, ruthenium, iridium, cobalt, rhodium, palladium, and a carbon alloy, and not limited to an elemental metal. For example, an electrode catalyst may be also a platinum-ruthenium alloy, a platinum-iridium alloy, a platinum-cobalt alloy, etc.

As an electroconductive material for a catalyst support a heretofore known electroconductive substance can be used without limitation thereto.

Although there is no particular restriction on a particulate electroconductive substance, insofar as it has electroconductivity, those chemically stable both at a positive electrode voltage and a negative electrode voltage are preferable, and among others a carbon powder can be favorably used as a particulate electroconductive substance. As a carbon powder, a heretofore known material, such as carbon black, graphite, and expanded graphite, may be adopted appropriately. Among others, carbon black, such as oil furnace black, channel black, lamp black, thermal black, and acetylene black, can be used favorably owing to its superior electron conductivity and large specific surface area. As such a carbon powder, a commercial product can be used, which include oil furnace black, such as Vulcan XC-72 Vulcan P, Blackpearls 880, Blackpearls 1100, Blackpearls 1300, Blackpearls 2000, and Regal 400 by Cabot Corporation, Ketjenblack EC by Lion Corporation, #3150, and #3250 by Mitsubishi Chemical Corporation; and acetylene black such as Denka Black by Denki Kagaku Kogyo K.K. Further, in addition to carbon black, it may be a natural graphite, pitch, coke, an artificial graphite obtained from an organic compound, such as polyacrylonitrile, a phenol resin, and a furan resin, carbon, and active carbon. The carbon powder may be subjected to processing such as a graphitization treatment in order to improve the corrosion resistance; and titania, etc., may be used as a support therefor.

As an additive material, an electroconductive auxiliary material, or a carbon fiber like substance and a water repellant material may be added into an electrode layer for imparting porosity and water repellency to the electrode layer.

An electrolyte may be contained in an electrode layer. The electrolyte can immobilize a catalyst as a binder, and play a role for transporting a proton generated by an anode oxidation reaction. As an electrolyte, an electrolyte which can be used in the aforedescribed electrolyte membrane can be used, without limitation thereto. There is no particular restriction on a method for incorporating an electrolyte into a catalyst layer. For example, it may exist as an electrolyte in a catalyst layer in a form of a mixture with a catalyst, may exist in a form of a mixture with a catalyst support (carbon, etc.), or may be utilized (instead of carbon, etc.) as a catalyst support. The above methods may be used in a combination. While, an electrolyte may be contained only in either of an anode catalyst layer and a cathode catalyst layer. In other words, when a catalyst layer contains an electrolyte, it is not necessary that an electrolyte be contained in both an anode catalyst layer and a cathode catalyst layer.

A peroxide decomposition catalyst may be incorporated in an electrolyte in a catalyst layer. A method therefor is similar to the method for incorporating a peroxide decomposition catalyst immobilized on a support into an electrolyte membrane. A peroxide decomposition catalyst contained in a catalyst layer can suppress deterioration of constituting substances of the catalyst layer, such as a catalyst, an electroconductive material, and an electrolyte, by decomposing a hydrogen peroxide or a peroxy radical generated by a fuel cell reaction.

A gas diffusion layer may contain a peroxide decomposition catalyst immobilized on a support. A gas diffusion layer is a sheet form material having electroconductivity and gas permeability; and a heretofore known gas diffusion layer can be used without limitation thereto. Specific examples thereof include various gas permeable electroconductive base materials, such as carbon paper, carbon woven cloth, carbon nonwoven cloth, carbon felt, and porous metal, provided with a water-retentive microporous layer (MPL), if necessary by conducting a water-repellent treatment and/or a hydrophilization treatment. Only an electroconductive base material, or only an MPL may be used as a gas diffusion layer. Further, a porous sheet prepared with a carbon powder and a fluorinated resin may be used as an electroconductive base material or an MPL. For example, a sheet formed with a carbon black using polytetrafluoroethylene as a binder can be used as a porous sheet. The thickness of a gas diffusion layer is generally in a range of 10 to 500 µm, and preferably 100 to 250 µm.

The microporous layer is porous with the pore size in the order of the magnitude of micrometer, and composed of an electroconductive material such as carbon and a water repellant material; and it may further contain according to need a hydrophilic material such as an electrolyte. A heretofore known microporous layer can be used without particular restriction. For example, a microporous layer may be in a porous and self-standing sheet form, or prepared by applying an electroconductive ink directly onto a porous base material. Methods for preparing a porous sheet are described in Japanese Published Unexamined Application No. 7-30270, and Japanese Published Unexamined Application No. 2006-252948.

A heretofore known porous base material can be used without particular restriction, and a carbon-based electroconductive porous base material or a metallic porous body (porous metal) may be used. Alternatively, a non-electroconductive porous base material impregnated with an electroconductive material may be used, or an electroconductive base material impregnated with an electroconductive material may be used.

As an electroconductive material, which is used for forming an electroconductive base material or incorporated in a microporous layer, carbon blacks, such as furnace black, lamp black, thermal black, and acetylene black, as well as graphite, active carbon, and metals can be used; and they may be used singly or 2 or more thereof in a combination. A preferable electroconductive carbonaceous powder is acetylene black or a mixture thereof. The acetylene black or a mixture thereof is superior in electroconductivity, water repellency, and chemical stability.

As a water repellant material and/or a hydrophilic material those utilized for binding an electroconductive material to form a film may be used.

As a water repellant material a fluorocarbon resin may be used. A fluorocarbon resin is favorable, also because it can cover the surface of an electroconductive carbonaceous powder to impart hydrophobicity (water repellency). Examples of a usable fluorocarbon resin include polytetrafluoroethylene (PTFE), a copolymer of tetrafluoroethylene (a copolymer of a monomer containing a fluorine atom such as hexa-fluoropolypropylene, and a monomer not containing a fluorine atom, such as ethylene), a polyvinylidene fluoride resin, and a polychlorotrifluoroethylene resin; and they may be used singly or in a combination of 2 or more thereof. A preferable fluorine resin is polytetrafluoroethylene (PTFE). This is because PTFE is superior in water repellency and chemically stable.

There is no particular restriction on a hydrophilic material, insofar as it is an electrolyte, which can be used in an electrolyte membrane. Use of a hydrophilic material can impart a water retention property to a gas diffusion layer. Further, a heretofore known material, such as an oxide, active carbon, and zeolite, can be added without limitation thereto. Further, as a hydrophilization treatment a heretofore known physical treatment, such as a corona treatment can be used without limitation thereto.

There is no particular restriction on a method or a place for incorporation of a peroxide decomposition catalyst immobilized on a support in a gas diffusion layer. Specifically, an immobilized peroxide decomposition catalyst may be mixed with a water repellant material or a hydrophilic material, and incorporated in a gas diffusion layer during a water-repellent treatment on an electroconductive base material, or formation of an MPL. Further, during formation of a porous sheet, in addition to a carbon-based powder and a fluorinated resin an immobilized peroxide decomposition catalyst may be added to be incorporated in a porous sheet. It may be incorporated between an electroconductive base material and a microporous layer. A peroxide decomposition catalyst contained in a gas diffusion layer can suppress deterioration of constituting substances of the gas diffusion layer, such as an electroconductive base material, an MPL, and a porous sheet, by decomposing a hydrogen peroxide or a peroxy radical generated by a fuel cell reaction.

A gas sealing material or a separator may contain a peroxide decomposition catalyst immobilized on a support.

Before getting on to a gas sealing material or a separator, a membrane electrode assembly (MEA) will be described. An MEA is an assembly unifying a polyelectrolyte membrane and an anode catalyst layer placed on a surface thereof and a cathode catalyst layer placed on the other surface, or is a combination of the same with a gas diffusion layer. On outer sides of an MEA are placed electroconductive separators to mechanically solidify the same and connect electrically adjacent MEA together in series. Further, to prevent a supplied fuel gas and oxidant gas from leaking outward, or prevent the two gases from mixing each other, a gas sealing material and a gasket are provided. At a part of a separator contacting an MEA a gas channel for supplying a reaction gas to an electrode surface or discharging a generated gas or a surplus gas is formed. In a practical fuel cell MEAs, separator plates and cooling units are stacked alternately up to 10 to 100 cells arranging anodes and cathodes on predetermined sides, and the assembly is sandwiched by end plates intercalating a current collector plate and an insulator plate, and bound tightly together by tie bolts.

There is no particular restriction on a method or a place for incorporation of a peroxide decomposition catalyst immobilized on a support in a gas sealing material or a separator. Specifically, an immobilized peroxide decomposition catalyst may be mixed with a water repellant material or a hydrophilic material, and coated on a gas sealing material or a separator. In this regard, a water repellant material or a hydrophilic, material may be identical with that used for the gas diffusion layer. Further, an immobilized peroxide decomposition catalyst may be incorporated during formation of a gas sealing material or a separator. A peroxide decomposition catalyst immobilized on a support may be incorporated uniformly, or with a concentration gradient, or, for example, limited to an area where a gas sealing material contacts an electrolyte membrane, or limited to a part of a separator such as a rib. A peroxide decomposition catalyst contained in a gas sealing material or a separator can suppress deterioration of a gas sealing material or a separator, as well as deterioration of an electrolyte membrane, an electrode layer, or a diffusion layer, contacting a gas sealing material or a separator, by decomposing a hydrogen peroxide or a peroxy radical generated by a fuel cell reaction.

EXAMPLE

Example 1

Preparation of Polyelectrolyte Membrane (Example 1)

As a peroxide decomposition catalyst cerium was provided, and with the same a substance (zirconium phosphate carrying cerium, average particle diameter: 1 μm), in which cerium was immobilized in a NASICON-type zirconium phosphate ($HZr_2(PO_4)_3$) having a three-dimensional network, was prepared. Immobilization was performed as follows. To a NASICON-type zirconium phosphate ($HZr_2(PO_4)_3$), a cerium nitrate $Ce(NO_3)_3$ aqueous solution was added to a molar ratio of 1/0.3 and mixed. The mixture was then dried at 110° C., followed by a heat treatment at 600° for 4 hours, then pulverized by a ball mill, washed thoroughly by pure water for removing impurities, and thereby completing the preparation of a peroxide decomposition catalyst, in which cerium was immobilized in a NASICON-type zirconium phosphate.

The zirconium phosphate carrying cerium was provided as a peroxide decomposition catalyst immobilized on a support, so as to make the cerium (Ce) content with respect to a polyelectrolyte at 0.2 mass-%. As a polyelectrolyte 50 g of a perfluorocarbon copolymer having a sulfonic acid group [$CF_2=CF_2/CF_2=CFOCF_2CF$ $(CF_3)O(CF_2)_2SO_3H$ copolymer: ion exchange capacity of 1.25 mEq/g] was provided, which was then dissolved in 50 g of distilled water and 150 g of ethanol to prepare a polyelectrolyte resin solution (solid concentration 20 mass-%). Then 0.5 g of the zirconium phosphate carrying cerium and 250 g of the electrolyte resin solution was mixed at room temperature and stirred thoroughly by a stirrer to homogenize. Since 20% of the zirconium phosphate carrying cerium was cerium, the content of cerium (Ce) with respect to the polyelectrolyte was 0.2 mass-% (0.1 g (cerium)/50 g (electrolyte)=0.2%). The obtained mixture dispersion was applied on to a release film (an ethylene-tetrafluoroethylene copolymer (ETFE) film) by a coating process. On the coat (dispersion) a 10 μm-thick expanded porous PTFE membrane (by Japan Gore-Tex Inc., porosity 70%, average pore size 0.2 μm, tensile strength 30 MPa, weight 6.5 g/m$^2$) was contacted as a reinforcing material to impregnate the dispersion into the expanded porous PTFE membrane to prepare an impregnated membrane. Then the prepared impregnated membrane was dried in an oven at 140° C. for 5 min. On the impregnated membrane the same polyelectrolyte resin solution containing the zirconium phosphate carrying cerium was coated, dried similarly in an oven to obtain a 20 μm-thick polyelectrolyte membrane reinforced by the expanded porous PTFE membrane.

Example 2

As a peroxide decomposition catalyst cerium was provided, and with the same a substance (layered zirconium phosphate carrying cerium, average particle diameter: 1 μm), in which cerium was immobilized in zirconium phosphate having a layered structure, was prepared.

As a preparation process, to zirconium phosphate having a layered structure a cerium nitrate $Ce(NO_3)_3$ aqueous solution was added at a molar ratio of 1/3 and stirred at 70° C. for 5 days. Then only the solid phase was collected and washed thoroughly by pure water, dried at 60° C., and thereby completing preparation of a layered zirconium phosphate carrying cerium, which was immobilized between layers.

This was mixed with a polyelectrolyte resin solution of a perfluorocarbon copolymer having a sulfonic acid group as a polyelectrolyte, similarly as in Example 1 to make the cerium (Ce) content with respect to the polyelectrolyte at 0.2 mass-%, to obtain a 20 μm-thick polyelectrolyte membrane reinforced by the expanded porous PTFE membrane.

Example 3

As a peroxide decomposition catalyst cerium was provided, and with the same a substance (layered smectite carrying cerium, average particle diameter: 3 μm), in which cerium was immobilized in smectite having a layered structure, was prepared.

As a preparation process, to smectite having a layered structure a cerium nitrate $Ce(NO_3)_3$ aqueous solution was added at a molar ratio of 1/3 and stirred at 70° C. for 5 days. Then only the solid phase was collected and washed thoroughly by pure water, dried at 60° C., and thereby completing preparation of a layered smectite carrying cerium, which was immobilized between layers.

This was mixed with a polyelectrolyte resin solution of a perfluorocarbon copolymer having a sulfonic acid group as a polyelectrolyte, similarly as in Example 1 to make the cerium (Ce) content with respect to the polyelectrolyte at 0.2 mass-%, to obtain a 20 μm-thick polyelectrolyte membrane reinforced by the expanded porous PTFE membrane.

Comparative Example 1

Preparation of Polyelectrolyte Membrane (Comparative Example 1)

As a peroxide decomposition catalyst cerium oxide (particle diameter: 0.2 μm) was provided. The peroxide decomposition catalyst was not immobilized in a support. The peroxide decomposition catalyst was mixed with a polyelectrolyte resin solution of a perfluorocarbon copolymer having a sulfonic acid group as a polyelectrolyte, similarly as in Example 1 to make the cerium (Ce) content with respect to the polyelectrolyte at 0.2 mass-%, to obtain a 20 μm-thick polyelectrolyte membrane reinforced by the expanded porous PTFE membrane.

Comparative Example 2

Preparation of Polyelectrolyte Membrane (Comparative Example 2)

As a peroxide decomposition catalyst cerium phosphate was provided. The peroxide decomposition catalyst was also not immobilized in a support. The peroxide catalyst was mixed with a polyelectrolyte resin solution of a perfluorocarbon copolymer having a sulfonic acid group as a polyelectrolyte, similarly as in Example 1 to make the cerium (Ce) content with respect to the polyelectrolyte at 0.2 mass-%, to obtain a 20 μm-thick polyelectrolyte membrane reinforced by the expanded porous PTFE membrane.

Production of Membrane Electrode Assembly (MEA)

A specimen in a size of 10 cm×10 cm was cut out from the thus prepared polyelectrolyte membrane and on both the sides were placed electrode layers (5 cm×5 cm) based on PRIMEA® 5580 (by Japan Gore-Tex Inc.). Then the respective electrode layers were transferred to the polyelectrolyte membrane by a hot press process (130° C., 6 min) to produce a membrane electrode assembly (MEA) composed of an anode electrode layer, a polyelectrolyte membrane, and a cathode electrode layer.

Evaluation of Membrane Electrode Assembly (MEA)

The MEA was placed between 2 gas diffusion layers made of CNW10A (CARBEL® by Japan Gore-Tex Inc.) in a size of 52 mm×52 mm, and built in to an electricity generation cell, which was then subjected to an open circuit voltage test (OCV test) as an accelerated test. The OCV test was conducted at normal pressure supplying hydrogen/air to the anode side/the cathode side respectively at a flow rate of 0.1 L/min. The cell temperature was set at 120° C., and the dew points of the anode gas and the cathode gas were set at 85° C. respectively. The cell was operated without generating electricity in a state of open circuit and after 100 hours the fluorine ion concentration in effluent water was measured for comparing the degree of deterioration of the polyelectrolyte membrane. More specifically, after a lapse of 100 hours of the OCV test, effluent water was collected from gas outlets in the cell at both the anode side and the cathode side by trapping for 10 hours as an effluent water sample for a fluorine ion concentration measurement, which was determined by ion chromatography (DX-320 by Nippon Dionex K.K.). The measurement results are shown in the following Table 1.

TABLE 1

|  | Dissolution amount of fluorine ion (Relative value) |
|---|---|
| Example 1 | 0.2 |
| Example 3 | 0.3 |
| Comparative Example 1 | 1.0 |
| Comparative Example 2 | 0.2 |

In Examples 1 and 3 (the present invention) the fluorine ion dissolution amount is less than in Comparative Examples. Conceivably this was because an immobilized peroxide decomposition catalyst continued to decompose hydrogen peroxide or peroxy radicals to reduce the dissolution amount of a fluorine component contained in an electrolyte.

Further, to investigate the long-term durability due to dissolution of a peroxide decomposition catalyst, etc. a simulated load cycle from a low electrical current to a high electrical current was repeated. As for the load cycle condition, 10,000 cycles of a cycle of open circuit voltage, 0.6 V and 0.4 V respectively for 10 sec were carried out. Hydrogen and air were supplied at a flow rate of 0.5 L/min to the anode side and at 2.0 L/min to the cathode side respectively. The cell temperature was set at 80° C., and the dew points of the anode gas and the cathode gas were set at 80° C. respectively. The residual rate of a peroxide decomposition catalyst was calculated from the cerium amount in an MEA quantitatively analyzed by inductively-coupled plasma emission spectrometry (ICP emission spectrometry) (CIROUS MARK 11, by Rigaku Corporation). In this regard, to calculate the residual rate, the cerium amounts in an MEA before and after the load cycle test were quantitatively determined and compared. As a pretreatment for an analysis of an MEA, an ash method was employed. The results are shown in the following Table 2.

TABLE 2

|  | Residual rate of peroxide decomposition catalyst (Relative value) |
| --- | --- |
| Example 1 | 1.5 |
| Example 2 | 1.3 |
| Example 3 | 1.3 |
| Comparative Example 1 | 1.0 |
| Comparative Example 2 | 1.3 |

In Examples 1, 2 and 3 (the present invention) the cerium residual rate is higher than in Comparative Examples. Conceivably this is because a peroxide decomposition catalyst was immobilized in a three-dimensional structural network or in a layered structure, and therefore the cerium residual amount in an MEA was large even after a long-term durability test of 10,000 cycles.

In Comparative Example 2 such durability as in Example 1 (the present invention) was not recognized, but such durability (peroxide decomposition catalyst residual rate) as in Examples 2 and 3 could be recognized.

Concerning electricity generation performance, with respect to both Examples 1 and 3, the performance equivalent to Comparative Example 1 was recognized. However, with respect to Comparative Example 2, it was recognized that the electricity generation performance was lower than in Comparative Example 1 from the initial stage.

This is conceivably attributable to that phosphorus in not-immobilized cerium phosphate was moved inside the stack or discharged outward from the system by electroosmotic water or back diffusion water to poison the catalyst in the electrode layers. Further, by the movement of the phosphorus a dissociated cerium ion forms a salt with the electrolyte membrane to decrease eventually the ion conductivity of the electrolyte.

Figure 2:
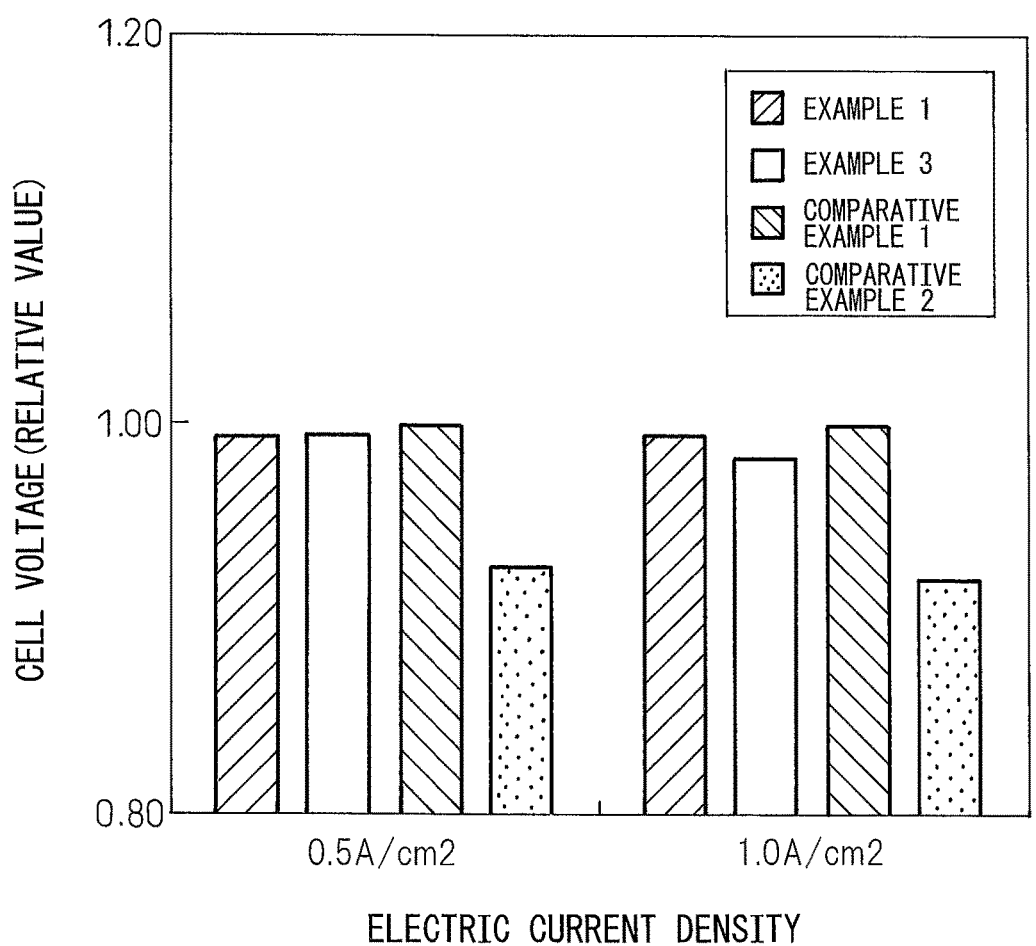
FIG. 2 is a graphical representation comparing the electricity generation performances of batteries according to the present invention and comparative examples.

The evaluation results are shown in FIG. 2.

The evaluation of the electricity generation performance was conducted by supplying hydrogen (utilization factor: 80%) and air (utilization factor: 40%) to the anode side and the cathode side respectively. In this case, the cell temperature, the dew point at the anode side, and the dew point at the cathode side were respectively set at 80° C. The supplied hydrogen and air were respectively humidified.

For the performance comparison, the cell voltages in Comparative Example 1 at 0.5 A/cm$^2$ and 1.0 A/cm$^2$ were defined as 1.0 (reference values) respectively, and compared with the voltage values in each Example.

What is claimed is:

1. A fuel cell constituted of: a membrane electrode assembly comprising a polyelectrolyte membrane, electrode layers placed on both the sides of the electrolyte membrane, and gas diffusion layers placed on the side opposite to the electrolyte membrane of the electrode layers; a gas sealing material placed surrounding the membrane electrode assembly; and separators sandwiching the foregoing, wherein the fuel cell comprises a peroxide decomposition catalyst immobilized on a support;
wherein the immobilized peroxide decomposition catalyst comprises cerium; wherein the support is zirconium phosphate having a three-dimensional network, a clay mineral having an interlayer structure, or zirconium phosphate having an interlayer structure;
wherein the immobilized peroxide decomposition catalyst is immobilized in the pores forming the three-dimensional network or in the interlayer structure; wherein the fuel cell comprises the immobilized peroxide decomposition catalyst within the range of 0.01 to 80 mass-% with respect to the mass of the polyelectrolyte; and wherein the particle diameter of the support is from 0.001 μm to 20 μm (both inclusive).

2. The fuel cell according to claim 1, wherein the support is zirconium phosphate having a three-dimensional network.

3. The fuel cell according to claim 1, wherein the support is a clay mineral having an interlayer structure.

4. The fuel cell according to claim 1, wherein the support is zirconium phosphate having an interlayer structure.

5. The fuel cell according to claim 1, wherein the immobilized peroxide decomposition catalyst is placed in at least one of the electrolyte membrane, the electrode layer, the gas diffusion layer, the gas sealing material, or the separator, or between the same.

6. The fuel cell according to claim 1, wherein the electrolyte membrane comprises a fluoro polymer having a sulfonic acid group and is reinforced by a reinforcing layer.

7. The fuel cell according to claim 2, wherein the zirconium phosphate is NASICON-type zirconium phosphate ($HZr_2(PO_4)_3$).

8. The fuel cell according to claim 3, wherein the clay mineral is smectite.

9. The fuel cell according to claim 1, wherein the immobilized peroxide decomposition catalyst is incorporated in the polyelectrolyte membrane.

10. The fuel cell according to claim 1, comprising the immobilized peroxide decomposition catalyst in an amount within the range of 0.05 to 10 mass-% with respect to the mass of the polyelectrolyte.

11. The fuel cell according to claim 1, comprising the immobilized peroxide decomposition catalyst in an amount of 0.2 mass-% with respect to the mass of the polyelectrolyte.

12. A fuel cell constituted of: a membrane electrode assembly comprising a polyelectrolyte membrane, electrode layers placed on both the sides of the electrolyte membrane, and gas diffusion layers placed on the side opposite to the electrolyte membrane of the electrode layers; a gas sealing material placed surrounding the membrane electrode assembly; and separators sandwiching the foregoing, wherein:
the fuel cell comprises a peroxide decomposition catalyst immobilized on a support;
the immobilized peroxide decomposition catalyst immobilized on the support is incorporated in the polyelectrolyte membrane;

the immobilized peroxide decomposition catalyst comprises cerium;

the support is zirconium phosphate having a three-dimensional network, a clay mineral having an interlayer structure, or zirconium phosphate having an interlayer structure, wherein the immobilized peroxide decomposition catalyst is immobilized in the pores forming the three-dimensional network or in the interlayer structure;

the particle diameter of the support is from 0.001 µm to 20 µm (both inclusive);

the fuel cell comprises the immobilized peroxide decomposition catalyst in amount within the range of 0.05 to 10 mass-% with respect to the mass of the polyelectrolyte.

13. The fuel cell according to claim 12, wherein the zirconium phosphate is NASICON-type zirconium phosphate ($HZr_2(PO_4)_3$).

14. The fuel cell according to claim 12, wherein the clay mineral is smectite.

15. A fuel cell constituted of: a membrane electrode assembly comprising a polyelectrolyte membrane, electrode layers placed on both the sides of the electrolyte membrane, and gas diffusion layers placed on the side opposite to the electrolyte membrane of the electrode layers; a gas sealing material placed surrounding the membrane electrode assembly; and separators sandwiching the foregoing, wherein the fuel cell comprises a peroxide decomposition catalyst immobilized on a support;

wherein the support is NASICON-type zirconium phosphate ($HZr_2(PO_4)_3$); wherein the fuel cell comprises the immobilized peroxide decomposition catalyst within the range of 0.05 to 10 mass-% with respect to the mass of the polyelectrolyte; and wherein the particle diameter of the support is from 0.001 µm to 20 µm (both inclusive).

16. The fuel cell according to claim 1, comprising the immobilized peroxide decomposition catalyst in an amount within the range of 0.03 to 50 mass-% with respect to the mass of the polyelectrolyte.

* * * * *